(12) United States Patent
Maruno et al.

(10) Patent No.: US 7,758,129 B2
(45) Date of Patent: Jul. 20, 2010

(54) ATTACHING STRUCTURE OF SPLIT TYPE SEAT BACK

(75) Inventors: Yuuki Maruno, Shizuoka (JP); Masashi Wada, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 12/105,516

(22) Filed: Apr. 18, 2008

(65) Prior Publication Data
US 2008/0258529 A1  Oct. 23, 2008

(30) Foreign Application Priority Data
Apr. 20, 2007  (JP)  ............... 2007-111101

(51) Int. Cl.
*B60N 2/36* (2006.01)
(52) U.S. Cl. ............... 297/440.15; 297/378; 297/463.1; 297/248; 296/65.09; 296/65.16; 296/65.17
(58) Field of Classification Search ............ 297/440.15, 297/463.1, 248, 378.1, 378.11, 378.12, 378.13, 297/378.14; 296/65.09, 65.16, 65.17
See application file for complete search history.

(56) References Cited

U.S. PATENT DOCUMENTS

| | | | | |
|---|---|---|---|---|
| 2,952,490 A | * | 9/1960 | Pfaff | 296/68.1 |
| 4,286,819 A | * | 9/1981 | Inoue et al. | 296/65.17 |
| 4,394,047 A | * | 7/1983 | Brunelle | 297/362.12 |
| 4,572,569 A | * | 2/1986 | Haßmann | 297/378.13 X |
| 4,708,385 A | * | 11/1987 | Kondo | 296/65.17 |
| 4,958,877 A | * | 9/1990 | Lezotte et al. | 296/65.17 |
| 5,015,026 A | * | 5/1991 | Mouri | 296/65.17 |
| 5,263,763 A | * | 11/1993 | Billette | 296/65.17 |
| 5,582,453 A | * | 12/1996 | Leuchtmann et al. | 296/65.09 |
| 5,685,612 A | * | 11/1997 | MacDonald et al. | 297/378.1 |
| 5,700,058 A | * | 12/1997 | Balagurumurthy et al. | 297/440.15 |
| 5,716,100 A | * | 2/1998 | Lang | 297/378.12 |
| 5,741,046 A | * | 4/1998 | Leuchtmann et al. | 297/378.13 |
| 5,803,549 A | * | 9/1998 | Bolsworth et al. | 297/463.1 |
| 5,873,631 A | * | 2/1999 | Peck et al. | 297/378.11 |
| 6,030,044 A | * | 2/2000 | Kosugi et al. | 297/440.16 |
| 6,174,030 B1 | * | 1/2001 | Matsuo | 297/463.1 |
| 6,701,572 B2 | * | 3/2004 | Bechthold | 16/235 |
| 7,055,902 B2 | * | 6/2006 | Matsushita | 297/218.1 |

(Continued)

FOREIGN PATENT DOCUMENTS

DE   44 05 698   8/1995

(Continued)

OTHER PUBLICATIONS

Office Action issued by the German Patent and Trademark Office on Jul. 23, 2009.

*Primary Examiner*—Rodney B White
(74) *Attorney, Agent, or Firm*—Stein McEwen, LLP

(57) ABSTRACT

A pair of seat backs are arranged in a vehicle width direction. A pair of floor brackets attach outer end portions of the seat backs in the vehicle width direction to a floor of the vehicle. A pair of center hinge brackets attach inner end portions of the seat backs in the vehicle width direction to the floor. A pair of connecting portions are provided in the center hinge brackets which are adjacent to each other in the vehicle width direction. The seat backs are independently pivotably attached to the floor. The connecting portions are connected with each other.

9 Claims, 8 Drawing Sheets

U.S. PATENT DOCUMENTS

| | | | |
|---|---|---|---|
| 7,073,861 B2 * | 7/2006 | Ichikawa et al. | 297/378.1 |
| 7,083,215 B2 * | 8/2006 | Rhee et al. | 296/65.16 |
| 7,581,793 B2 * | 9/2009 | Hartmann et al. | 297/463.1 |
| 2005/0168039 A1 * | 8/2005 | Matsushita | 297/440.1 |

FOREIGN PATENT DOCUMENTS

| | | |
|---|---|---|
| DE | 10 2004 015 585 | 12/2004 |
| JP | 06107049 A * | 4/1994 |

* cited by examiner

ATTACHING STRUCTURE OF SPLIT TYPE SEAT BACK

The disclosure of Japanese Patent Application No. 2007-111101 filed on Apr. 20, 2007 including specification, drawings and claims is incorporated herein by reference in its entirety.

BACKGROUND

The present invention relates to split type seat back composing a seat for a vehicle. More particularly, the present invention relates to a split type seat back having a plurality of seat backs which are attached to a floor of the vehicle, arranged in the vehicle width direction and capable of independently moving with each other.

In a split type seat back for a vehicle, an outer end portion and an inner end portion in the vehicle width direction of each seat back are pivotally attached onto a vehicle body floor through a floor bracket and a center hinge bracket so that the each seat back can be independently moved with each other.

In this connection, in a case where a seat provided with such a split type seat back is a rear seat used for a wagon and no bulkhead is provided between the rear seat and a luggage compartment located behind the rear seat, the following problems may be encountered. At the time of sudden braking operation, luggage loaded in the luggage compartment is moved forward by the effect of inertia and collides with the seat backs. Then, an impact load is given being concentrated onto the center hinge brackets by the moving luggage. Therefore, the center hinge brackets are damaged. As a result, the right and left seat backs are opened like a double door and a resin cover to cover each center hinge bracket is disconnected.

Accordingly, Patent Document 1 proposes the following constitution. In a case where a load is given to the seat backs from the luggage compartment, right and left hinge portions engaged with the other side edge of the other seat back are provided in the center hinge brackets.

Patent document 1: Japanese Patent Publication No. 11-208336A

However, in the constitution proposed in the Patent Document 1, the following problems may be encountered. According to the form of deformation of the center hinge brackets, there is a possibility that teeth of the engaging portions of the hinge portions are not engaged with each other. Accordingly, they feel uncertain about the reliability. Further, machining of the engaging portions is complicated. Furthermore, a highly accurate machining is required. Therefore, the manufacture of the center hinge brackets is difficult.

SUMMARY

It is therefore an object of the present invention to provide an attaching structure of a split type seat back, which is capable of surely preventing the opening of seat backs and also preventing the disconnection of a cover in a case where a load is given to the split type seat back.

In order to accomplish the above objects, according to an aspect of the present invention, there is provided an attaching structure of split type seat back for a vehicle, comprising: a pair of seat backs arranged in a vehicle width direction; a pair of floor brackets attaching outer end portions of the seat backs in the vehicle width direction to a floor of the vehicle; a pair of center hinge brackets attaching inner end portions of the seat backs in the vehicle width direction to the floor; and a pair of connecting portions provided in the center hinge brackets which are adjacent to each other in the vehicle width direction, wherein the seat backs are independently pivotably attached to the floor; and wherein the connecting portions are connected with each other.

With the above configuration, the connecting portions provided in the right and left center hinge brackets, which are adjacent to each other in the vehicle width direction, are connected to each other. Therefore, even when a luggage loaded in a luggage compartment collides with the seat backs, the center hinge brackets to support the right and left seat backs can be prevented from being deformed or damaged. Accordingly, the opening of the right and left seat backs can be positively prevented by the simple structure.

The connecting portions and a rotary central axis of the seat backs may be disposed in substantially the same height.

With the above configuration, a deformation of the center hinge brackets due to an impact caused by a direct collision of the luggage with the center hinge brackets can be prevented at a position close to the rotary central axis of the seat backs. Namely, the impact caused by the direct collision of the luggage with the center hinge brackets can be surely prevented at a position in front of the center hinge brackets.

The attaching structure may further comprise hinge covers covering the center hinge brackets, wherein the hinge covers are formed with holes; and wherein a joining member is inserted into the holes, thereby connecting the connecting portions with each other.

With the above configuration, even if the center hinge brackets are somewhat deformed when the impact is given to the center hinge brackets, the hinge covers are not disconnected and scattered from the center hinge brackets. Even at the normal time when no impact is given to the center hinge bracket, it is possible to prevent the occurrence of such a problem that a passenger uselessly removes the hinge covers.

The attaching structure may further comprising: a first joining member connecting the connecting portions with each other; and second joining members fixing the hinge brackets; wherein the first joining member and the second joining members are disposed so as to forming an isosceles triangle.

With the above configuration, the second joining members connecting the center hinge brackets generate a resistance against the deformation of the center hinge brackets. Therefore, the deformation of the center hinge brackets can be suppressed and the opening of the right and left seat backs can be more surely prevented. Further, by the triangle fixed structure, a load given at the time of joining the center hinge brackets can be dispersed being well balanced and the seat backs can be highly accurately assembled to a vehicle body by the center hinge brackets.

The connecting portions may be formed so that a gap in a vertical direction is provided therebetween before being connected with each other.

With the above configuration, there is no possibility that the connecting portions are erroneously put on each other in the lateral direction. Further, the right and left seat backs can be accurately assembled. In this connection, the gap formed in the vertical direction between the right and left connecting portions before the connecting portions are connected with each other can be finally eliminated since the connecting portions are deformed when the connecting portions are connected with each other by a joining member such as a bolt.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Referring to the accompanying drawings, an embodiment of the present invention will be explained below.

Figure 1:
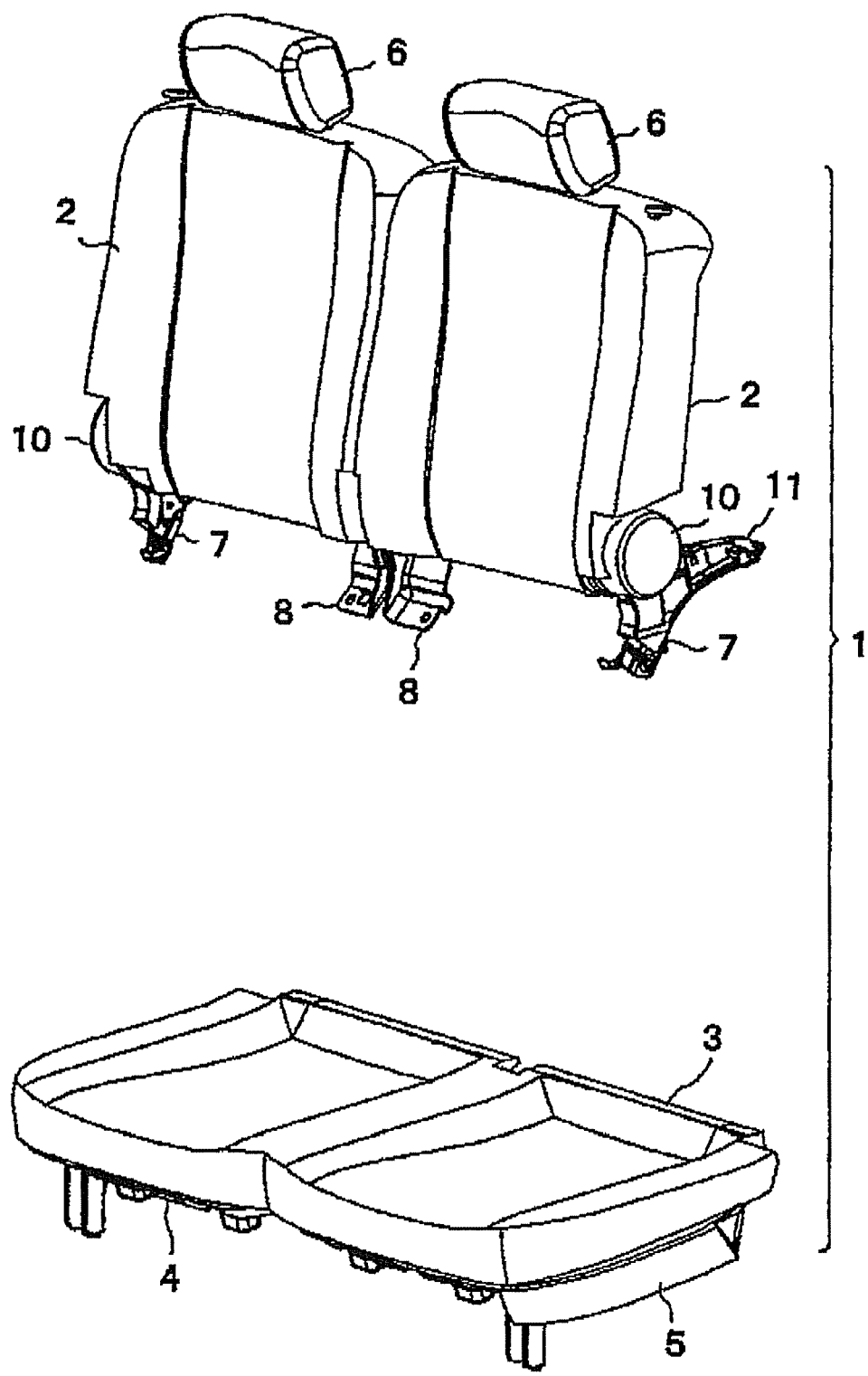
FIG. 1 is a perspective view showing a seat back and a seat cushion of a seat for a vehicle according to an embodiment of the present invention.

In the seat 1 for a vehicle shown in FIG. 1, the seat back 2 for chiefly supporting the upper part of a passenger and the seat cushion 3 for chiefly supporting the hip and the thighs of the passenger compose a seating space of the passenger. In this structure, the seat back 2 and the seat cushion 3 are respectively independently fixed to a vehicle body.

The seat cushion 3 described above is composed as follows. Below the seat cushion 3 made of a flexible material which forms the seating space, the cushion frame 4 is arranged which is made of material such as resin, the rigidity of which is somewhat high. On both sides of the cushion frame 4 in the vehicle width direction, side covers 5 made of resin are attached. In this structure, the cushion frame 4 protects the cushion from a floor face of the vehicle body. At the same time, the cushion frame 4 performs a function of maintaining a shape of the cushion. The side cover 5 performs a function of preventing a passenger from directly touching an edge portion of the cushion frame 4 and a floor face of the vehicle body.

The seat back 2 is divided into two portions and arranged in the vehicle width direction. In an upper portion of each seat back 2, the head rest 6 is arranged being capable of moving in the vertical direction. An outer lower end portion and an inner lower end portion in the vehicle width direction of each seat back 2 are pivotally attached to the floor of the vehicle body by the floor bracket 7 and the center hinge bracket 8 so that the outer lower end portion and the inner lower end portion can be independently pivoted about the central axes X1 and X2 shown in FIG. 2.

Figure 3:
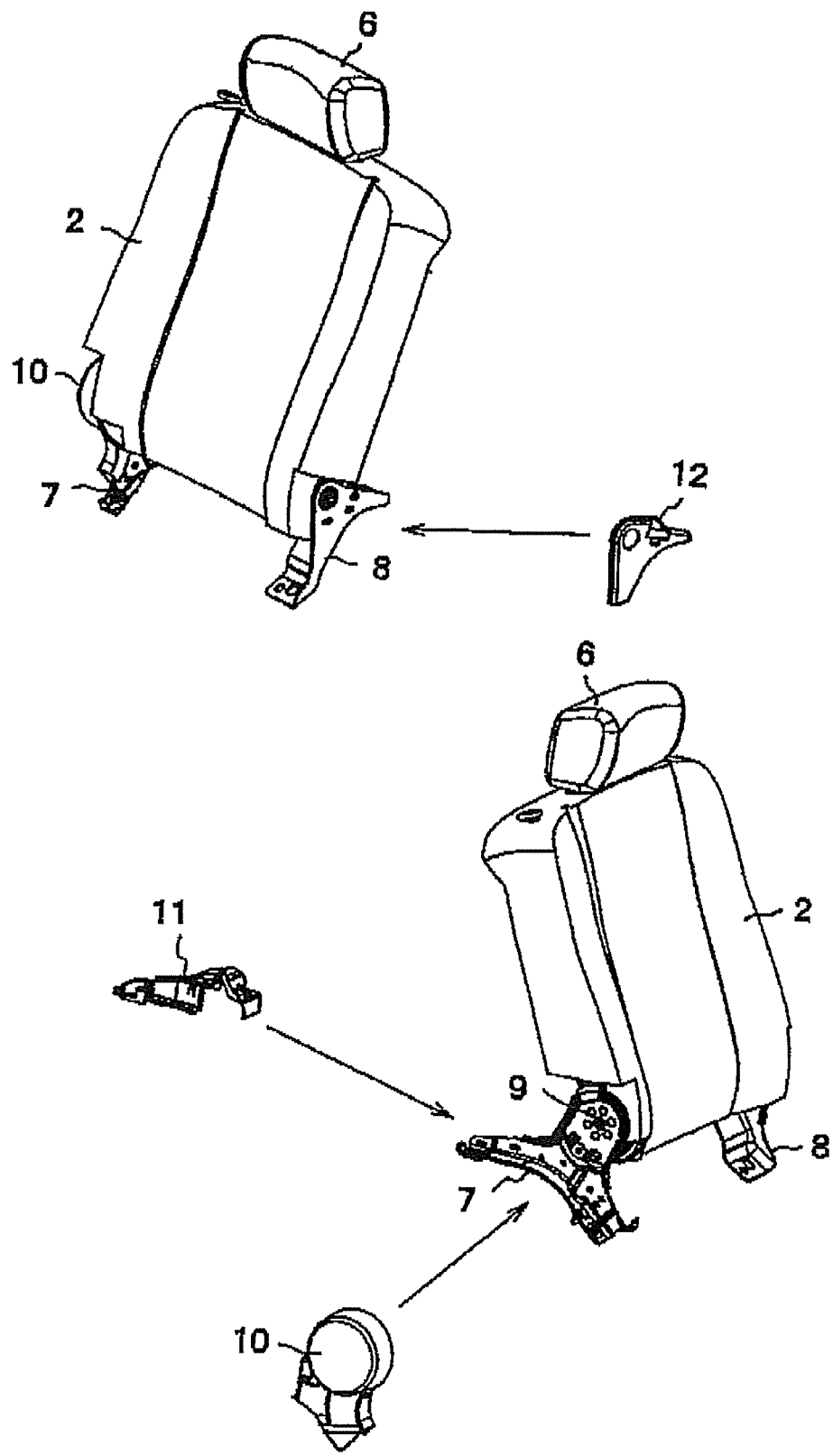
FIG. 3 is a perspective view showing a structure for attaching a cover to each seat back according to the embodiment.

As shown in FIG. 3, in the floor bracket 7 which is used for attaching the outer end portion in the vehicle width direction of each seat back 2 to the floor of the vehicle body, the reclining mechanism 9 capable of adjusting an inclination angle of each seat back 2 is provided. Each reclining mechanism 9 is covered with the outer cover 10 integrally made of resin.

Each floor bracket 7 and center hinge bracket 8 are respectively covered with a rear cover 11 and a hinge cover 12. By the rear cover 11, the hinge cover 12 and the outer cover 10, it is possible to prevent the deterioration of the outer appearance which is caused when the floor bracket 7, the center hinge bracket 8 and the reclining mechanism 9, which are made of metal, are exposed. Further, it is possible to prevent a passenger from directly touching these components.

Figure 2:
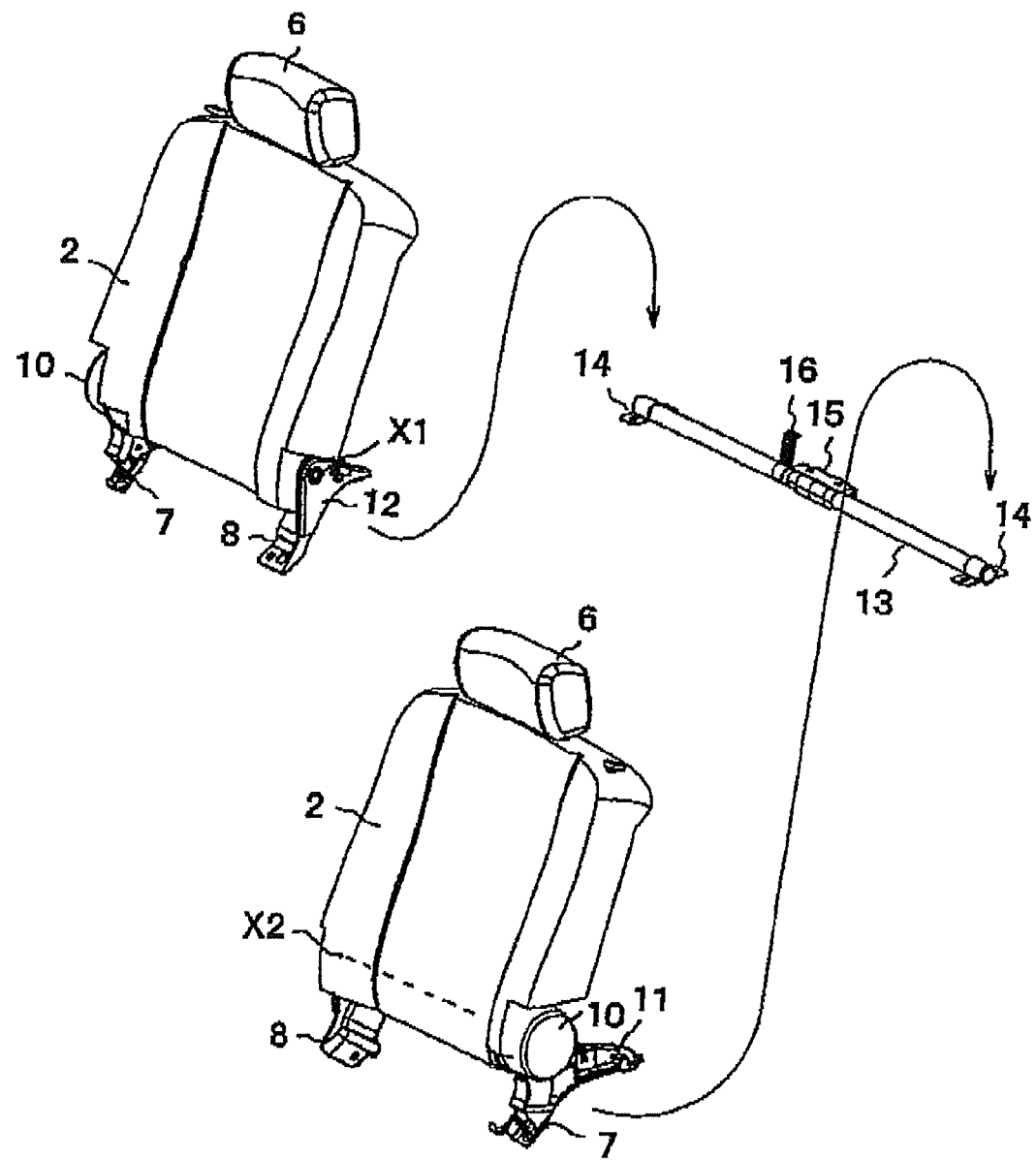
FIG. 2 is a perspective view showing right and left seat backs according to the embodiment.

On the rear side of the seat back 2, the supporting bar 13 shown in FIG. 2 is arranged being extended in the vehicle width direction under the condition that the supporting bar 13 is separated from the floor of the vehicle body. Both end portions in the longitudinal direction of this supporting bar 13 are respectively attached to the floor bracket 7. A rear end portion of the center hinge bracket 8 is attached to a central portion in the width direction of the supporting bar 13.

The supporting bar 13 is a pipe member, the shape of which is formed into a circular-pipe-shape. As shown in FIG. 2, at both end portions of the supporting member 13 in the longitudinal direction, the rectangular-plate-shaped side brackets 14 are respectively attached. At a center of the supporting bar 13 in the longitudinal direction, the center bracket 15, which is long in the vehicle width direction, is attached.

In this connection, a front portion and a rear portion of each floor bracket 7 are attached onto the floor of the vehicle body by bolts not shown in the drawing. When the side brackets 14 attached to both end portions in the longitudinal direction of the supporting bar 13 are joined to the floor brackets 7 by the bolts 16 described later shown in FIG. 8, both end portions in the longitudinal direction of the supporting bar 13 can be attached to the right and left floor brackets 7.

A forward end portion of each center hinge bracket 8 is attached onto the floor of the vehicle body by bolts not shown. A rear end portion of each center hinge bracket 8 is supported by a central portion in the longitudinal direction of the supporting bar 13 when the rear end portion is attached to the center bracket 15 of the supporting bar 13 by the bolts 17 described later shown in FIGS. 7 to 10.

Figure 4:
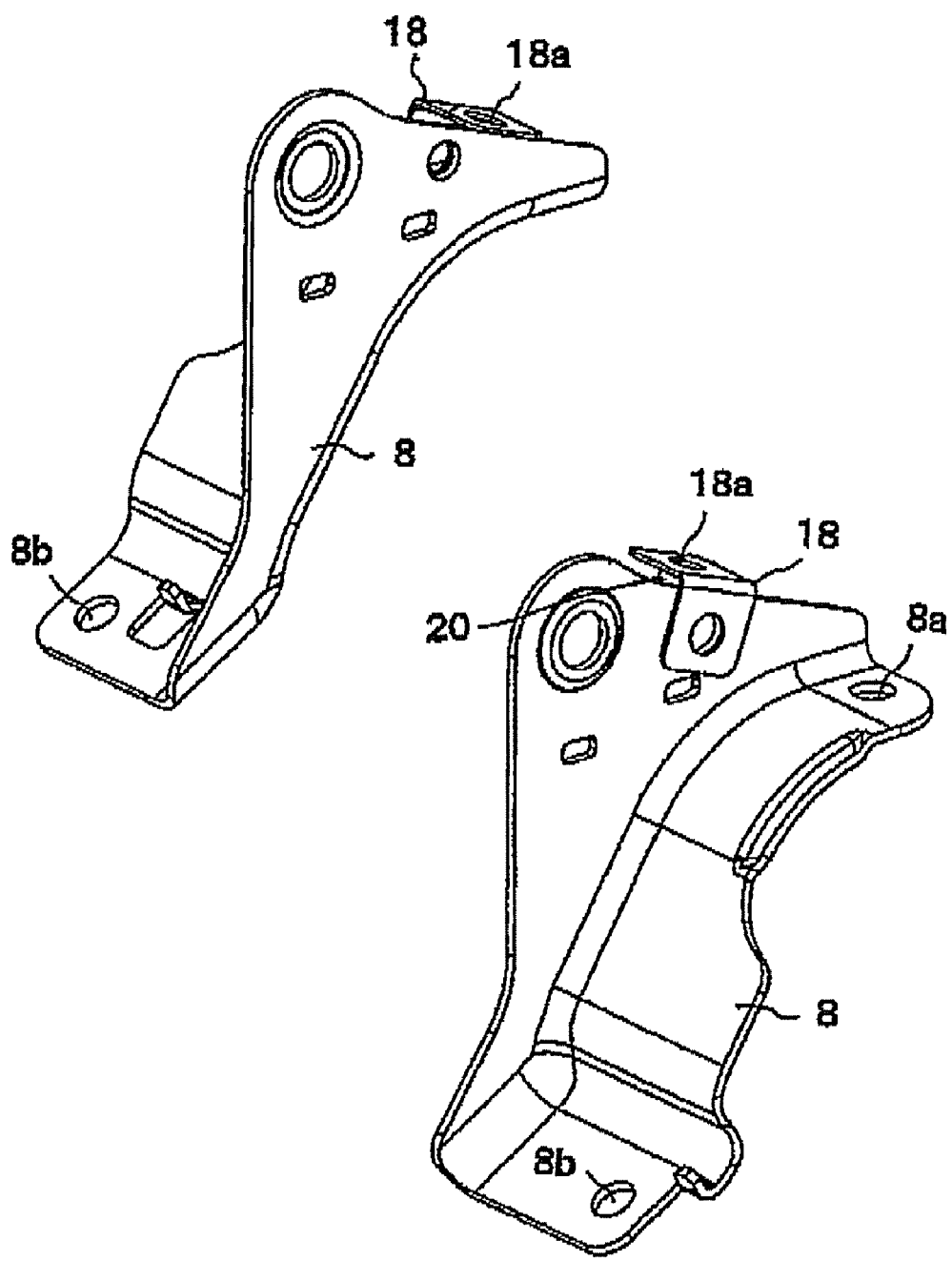
FIG. 4 is a perspective view showing a right and left center hinge brackets according to the embodiment.
Figure 5:
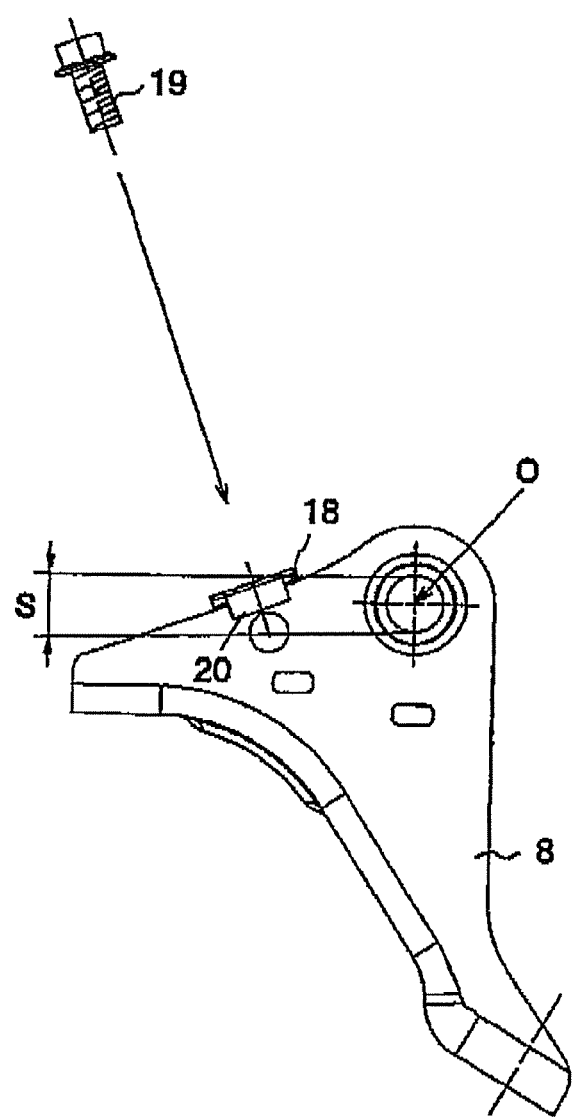
FIG. 5 is a side view showing a positional relation in height of the L-shaped bracket and the rotary central axis of the seat backs according to the embodiment.

In the present embodiment, as shown in FIG. 4, in portions of the right and left center hinge brackets 8 which are opposed to each other, L-shaped brackets 18, which are bent into an L-shape and used as a connecting portion, are provided. A circular hole 18a is formed in the horizontal portion of each L-shaped bracket 18. In this case, as shown in FIG. 5, each L-shaped bracket 18 is arranged at the substantially same height in the periphery of the rotary central axis O of the seat back 2. In this case, the substantially same height in the periphery of the rotary central axis O of the sheet back 2 is a height range shown by the reference mark S in the drawing. In this connection, in the present embodiment, the L-shaped bracket 18 is separately composed from the center hinge bracket 8 and welded to the center hinge bracket 8. However, the L-shaped bracket 18 and the center hinge bracket 8 may be integrally composed with each other.

In this connection, as described later, a pair of the L-shaped brackets 18 are vertically put on each other and connected with each other by the bolt 19 shown in FIGS. 7 to 10. However, in the periphery of the circular hole 18a on the lower face of the horizontal portion of one L-shaped bracket 18 (the left L-shaped bracket in the present embodiment)

which is located on the lower side, a welding nut 20 is welded. Concerning this matter, refer to FIGS. 4 and 5. In this connection, although not shown in the drawing, a gap is formed in the vertical direction between the right and left L-shaped brackets 18 before being connected with each other.

As shown in FIG. 4, in the front and at the rear of each center hinge bracket 8, circular holes 8a, 8b are respectively formed. The front end portion of each center hinge bracket 8 is attached to the floor of the vehicle body by a bolt not shown which is inserted into the circular hole 8a. As shown in FIGS. 7 to 10, the rear end portion of each center hinge bracket 8 is attached to a central portion in the vehicle width direction of the supporting bar 13 when the bolt 17 inserted into the circular hole 8b is screwed into the center bracket 15 attached to the central portion in the vehicle width direction of the supporting bar 13.

Figure 8:
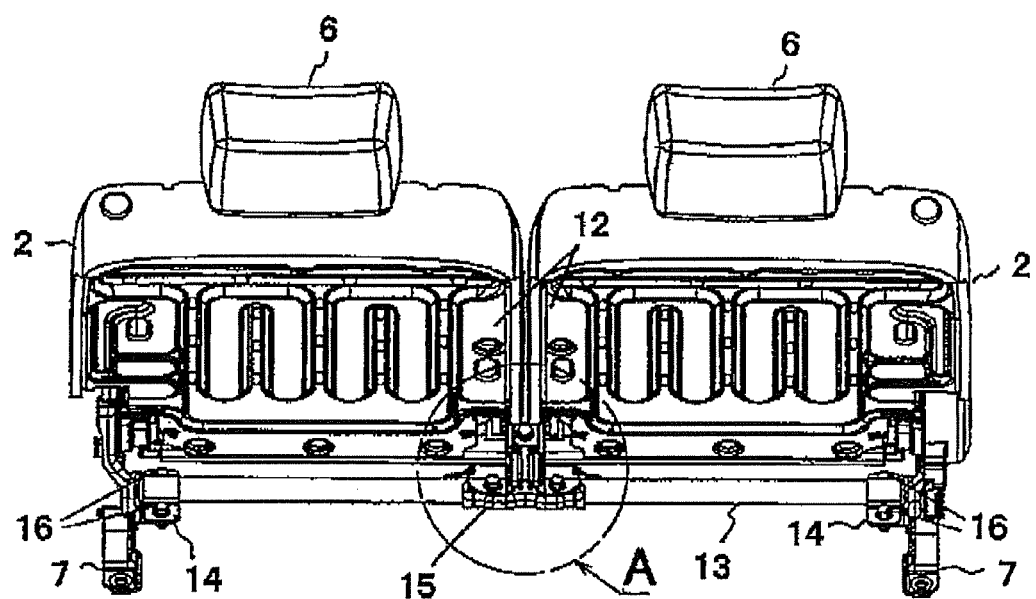
FIG. 8 is a rear view showing a seat back according to the embodiment.

On the other hand, as shown in FIG. 8, both end portions of the supporting bar 13, which extends in the vehicle width direction on the back of the seat back 2, are attached to the right and left floor brackets 7 when the side brackets 14 attached to both end portions are joined to the right and left floor brackets 7 by two bolts 16.

Figure 6:
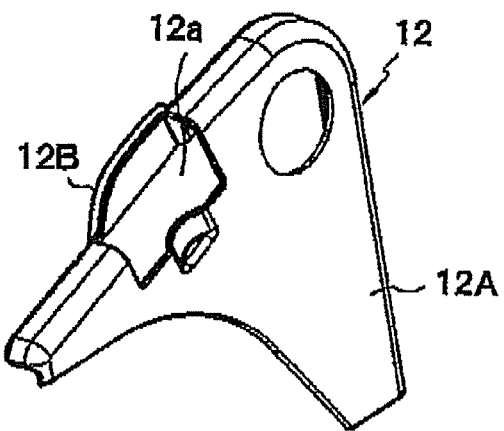
FIG. 6 is a perspective view showing a hinge cover according to the embodiment.
Figure 10:
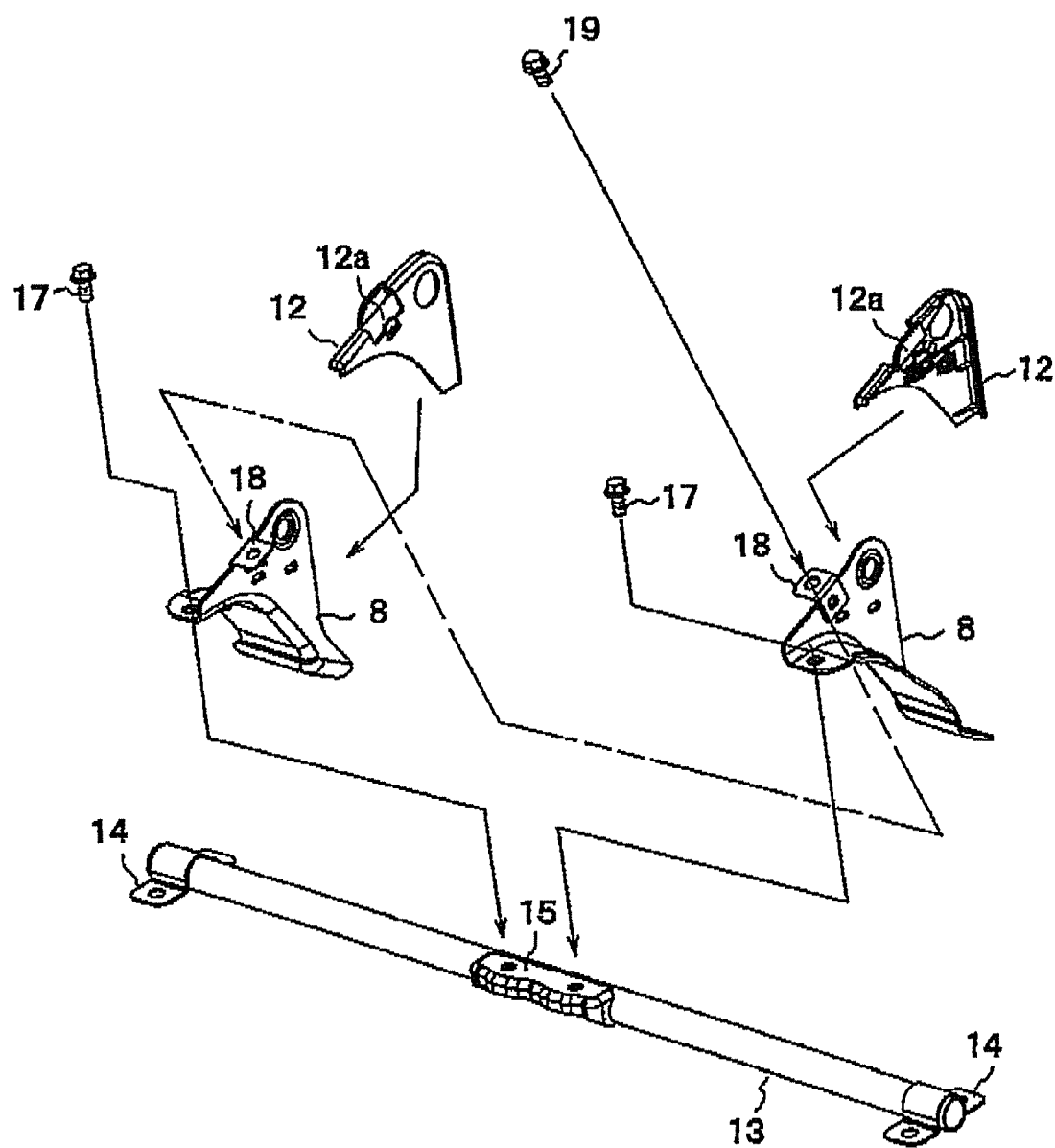
FIG. 10 is an exploded perspective view showing a fixing structure of the right and left center hinge brackets according to the embodiment.

In this connection, as shown in FIG. 6, the aforementioned hinge cover 12, which is attached to each center hinge bracket 8, includes a flange portion 12B vertically arranged so that it can surround a periphery of the face-like portion 12A which covers a face side opposed to the center hinge bracket 8. In a base end portion of the flange portion 12B, a rectangular hole 12a is formed. In this connection, in FIG. 6, only one (left) hinge cover 12 is shown. However, as shown in FIG. 10, the other (right) hinge cover 12 is composed in the same manner as that of one (left) hinge cover 12 except for the structure in which the right and the left are changed symmetrically to each other.

Figure 7:
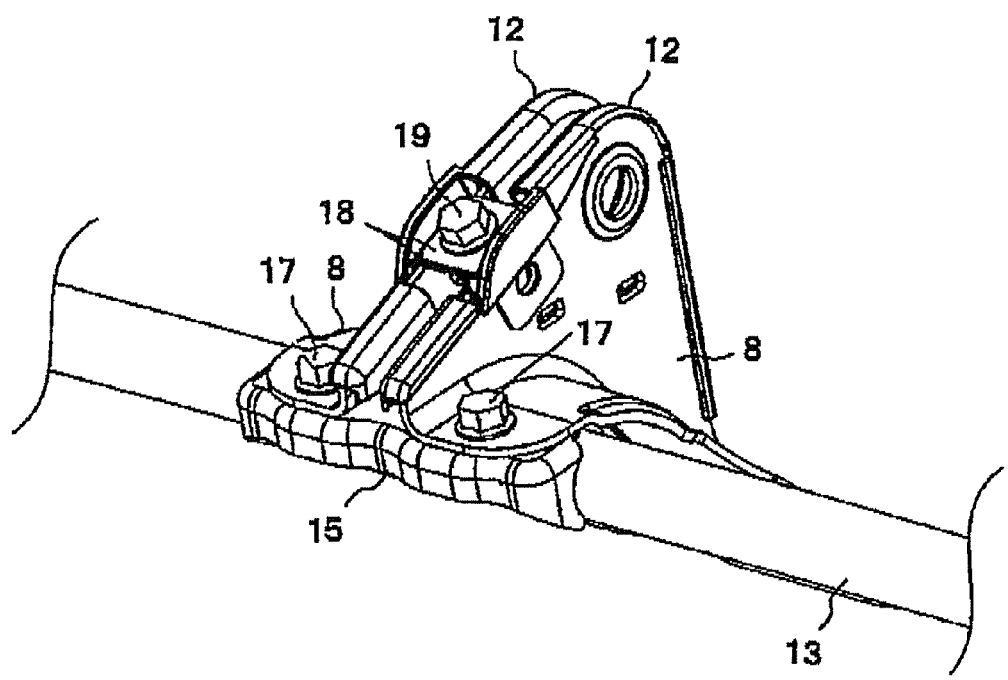
FIG. 7 is a perspective view showing a fixing portion of the right and left center hinge brackets according to the embodiment.
Figure 9:
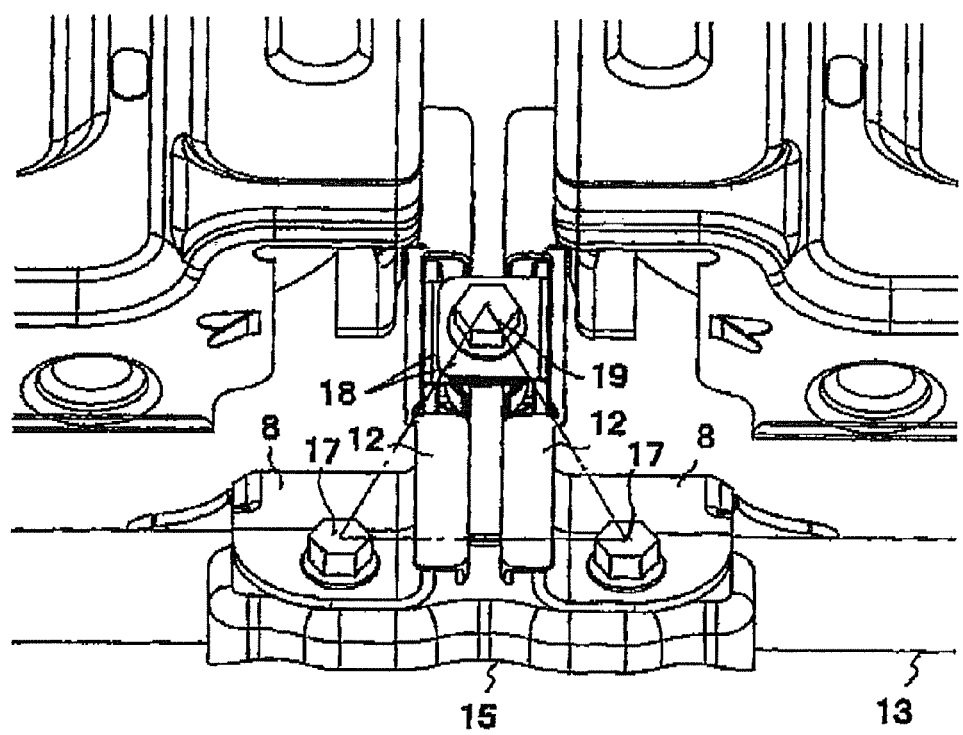
FIG. 9 is an enlarged view showing portion A of FIG. 8.

At the time of assembling the split type seat back 2, concerning the right and left center hinge brackets 8 for supporting the inner end portions of the right and left seat backs 2, as shown in FIGS. 7 to 9, the respectively arranged L-shaped brackets 18 are put on each other in the vertical direction. Specifically, the L-shaped bracket 18 provided in the right center hinge bracket 8 is put on the L-shaped bracket 18 provided on the left center hinge bracket 8. At this time, since a gap is formed in the vertical direction between the right and left L-shaped brackets 18 before the connection according to the designing standard, there is no possibility that the L-shaped brackets 18 are erroneously put on each other in the lateral direction. Further, the right and left sheet backs 2 can be accurately assembled. In this connection, the hinge cover 12 is previously assembled to each center hinge bracket 18.

As described above, under the condition that the right and left L-shaped brackets 18 are put on each other in the vertical direction, the rear end portion of each center hinge bracket 8 is attached to the center bracket 15 of the supporting bar 13 by the bolt 17. At the same time, the bolt 19 is inserted into the circular hole 18a, which is formed in the L-shaped bracket 18 which is put on each other in the vertical direction, and into the hole 12a formed on the hinge cover 12. The bolt 19 is screwed to the welding nut 20 welded onto the lower face of the L-shaped bracket 18 on the lower side (left side). Therefore, both L-shaped brackets 18 are connected to each other by the bolt 19. In this connection, the gap formed in the vertical direction between the right and left L-shaped brackets 18 before being connected with each other is finally eliminated since the L-shaped brackets 18 are somewhat deformed when both L-shaped brackets 18 are joined to each other by the bolt 19.

As shown in FIGS. 7 to 9, the bolt 19 for connecting both L-shaped brackets 18 to each other and the two bolts 17 for attaching the rear end portions of the right and left center hinge brackets 8 to the center bracket 15 of the supporting bar 13 form an isosceles triangle. In this connection, it is preferable that the triangle formed when the centers of the bolts 17, 19 are connected to each other is an equilateral triangle, the top of which is located in the front of a vehicle.

In the embodiment described above, the L-shaped brackets 18, which are respectively provided in the right and left center hinge brackets 8 being adjacent to each other in the vehicle width direction, are connected to each other. Therefore, even when luggage loaded in the luggage compartment collides with the seat back 2, the center hinge brackets 8 to support the right and left seat backs 2 can be prevented from being deformed or damaged. Accordingly, the opening of the right and left seat backs 2 can be positively prevented by the simple structure.

The L-shaped bracket 18 is arranged in the periphery of the rotary central axis O of the seat back 2. Therefore, a deformation of the center hinge bracket 8 can be prevented at a position close to the rotary central axis O of the seat back 2. Since the L-shaped bracket 18 is arranged at a position, the height of which is substantially the same as that of the rotary central axis O of the seat back 2, an impact caused by a direct collision of the luggage with the center hinge bracket 8 can be positively prevented at a position in front of the center hinge bracket 8.

In the present embodiment, the hole 12a is formed on the hinge cover 12 for covering the center hinge bracket 8 and the L-shaped brackets 18 are connected to each other by the bolt 19 inserted into the hole 12a. Therefore, even if the center hinge bracket 8 is somewhat deformed when an impact is given to the center hinge bracket, the hinge cover 12 is not disconnected and scattered from the center hinge bracket 8. Even at the normal time when no impact is given to the center hinge bracket 8, it is possible to prevent the occurrence of such a problem that a passenger uselessly removes the hinge cover 12.

Further, in the present embodiment, the bolt 19 for connecting the L-shaped brackets 18 with each other and the bolt 17 for fixing the rear end portion of the right and left center hinge brackets 8 form an isosceles triangle. Accordingly, a pair of bolts 17 for connecting the center hinge brackets 8 generate a resistance against the deformation of the center hinge bracket 8. Therefore, the deformation of the center hinge bracket 8 can be suppressed and the opening of the right and left seat backs 2 can be more positively prevented. Further, by the fixed structure of the triangle, a load given at the time of joining the center hinge bracket 8 can be dispersed being well balanced and the seat backs 2 can be highly accurately assembled to a vehicle body by the center hinge brackets 8.

In the present embodiment, both end portions in the longitudinal direction of the supporting bar 13, which is extended in the vehicle width direction on the rear side of the seat back 2, are attached to the floor bracket 7 and the rear end portion of the center hinge bracket 8 is attached to the supporting bar 13. Since the above constitution is employed, an impact load given to the seat backs 2 can be dispersed from the supporting bar 13 in the lateral direction. Therefore, the impact load can be transmitted from the right and left floor brackets 7 to the vehicle body floor side wall, the mechanical strength of which is high. As a result, there is no possibility that the impact load is given to the center hinge bracket 8 being concentrated. Therefore, it is possible to prevent the center hinge bracket 8 from being damaged. It is also possible to prevent the opening of the seat back 2 which is caused by the damage of the center hinge bracket 8.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An attaching structure for attaching a split type seat back for a vehicle to a floor of the vehicle, comprising:
    a first seat back and a second seat back which are arranged in a vehicle width direction;
    a first floor bracket attached to an outer end portion of the first seat back in the vehicle width direction and configured to be attached to the floor;
    a second floor bracket attached to an outer end portion of the second seat back in the vehicle width direction and configured to be attached to the floor;
    a first center hinge bracket attached to an inner end portion of the first seat back in the vehicle width direction and configured to be directly attached to the floor;
    a second center hinge bracket attached to an inner end portion of the second seat back in the vehicle width direction and configured to be directly attached to the floor;
    a first connecting portion provided in the first center hinge bracket; and
    a second connecting portion provided in the second center hinge bracket,
    wherein the first connecting portion and the second connecting portion are adjacent to each other in the vehicle width direction;
    wherein the seat backs are independently pivotable about central axes provided in the floor brackets and the center hinge brackets;
    wherein the first and second connecting portions are connected with each other; and
    wherein the first center hinge bracket and the second center hinge bracket are configured to be independently attachable to the first seat back and the second back, respectively.

2. The attaching structure as set forth in claim 1, wherein the first connecting portion, the second connecting portion and a rotary central axis of the first and second seat backs are disposed in substantially the same height.

3. The attaching structure as set forth in claim 1, further comprising a first hinge cover covering the first center hinge bracket and a second hinge cover covering the second center hinge bracket,
    wherein the first hinge cover is formed with a first hole and the second hinge cover is formed with a second hole; and
    wherein a joining member is inserted into the first and second holes, thereby connecting the first and second connecting portions with each other.

4. The attaching structure as set forth in claim 1, further comprising:
    a first joining member connecting the first and second connecting portions with each other;
    a second joining member for fixing the first center hinge bracket to the floor; and
    a third joining member for fixing the second center hinge bracket to the floor,
    wherein the first joining member, the second joining member and the third joining member are disposed so as to forming an isosceles triangle.

5. The attaching structure as set forth in claim 1, wherein the first and second connecting portions are formed so that a gap in a vertical direction is provided therebetween before being connected with each other.

6. The attaching structure set forth in claim 1, wherein the first and second connecting portions are connected with each other at a position different from a rotary central axis of the first and second seat backs.

7. The attaching structure as set forth in claim 6, wherein the first and second connecting portions are connected with a bolt.

8. The attaching structure as set forth in claim 7, wherein the bolt is inserted into the first and second connecting portions in a direction perpendicular to the rotary central axes of the first and second seat backs.

9. An attaching method for attaching a split type seat back for a vehicle to a floor of the vehicle, comprising:
    providing a first seat back;
    providing a second seat back;
    attaching a first floor bracket to an outer end portion of the first seat back in the vehicle width direction;
    attaching a second floor bracket to an outer end portion of the second seat back in the vehicle width direct;
    attaching a first center hinge bracket to an inner end portion of the first seat back in the vehicle width direction;
    attaching a second center hinge bracket to an inner end portion of the second seat back in the vehicle width direction;
    directly attaching the first floor bracket, the second floor bracket, the first center hinge bracket and the second center hinge bracket to the floor, such that the first and second seat backs are independently pivotable about central axes provided in the floor brackets and the center hinge brackets; and
    connecting a first connecting portion provided in the first center hinge bracket and a second connecting portion provided in the second center hinge bracket with each other after attaching the first and second center hinge brackets to the first and second seat backs, respectively.

* * * * *